Feb. 5, 1963    J. C. ANDERSON    3,076,425
BOAT CONVERSION STRUCTURE FOR MOTOR CARS
Filed June 8, 1959    2 Sheets-Sheet 1
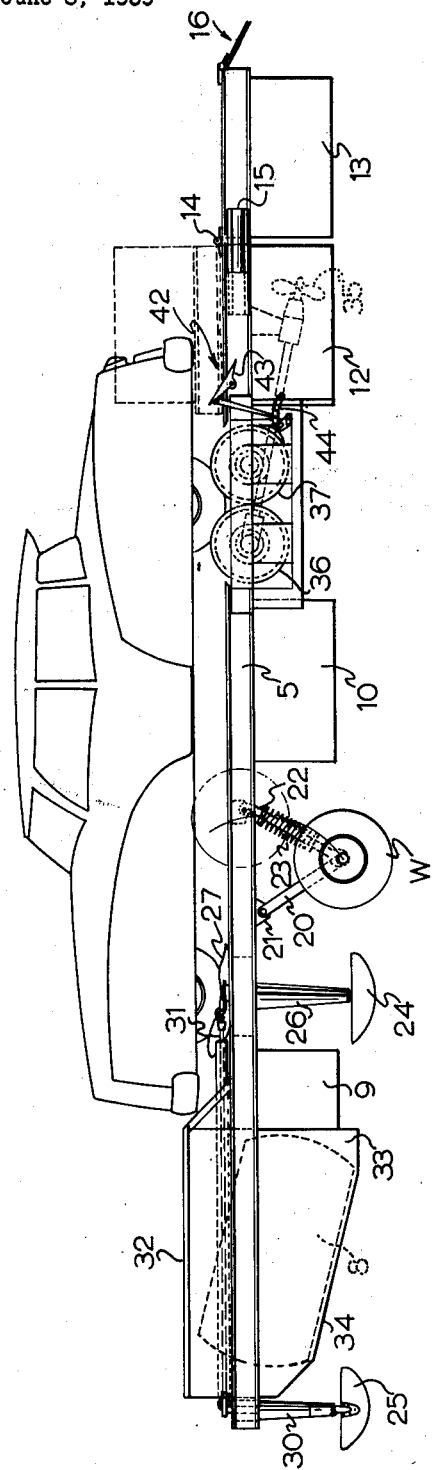
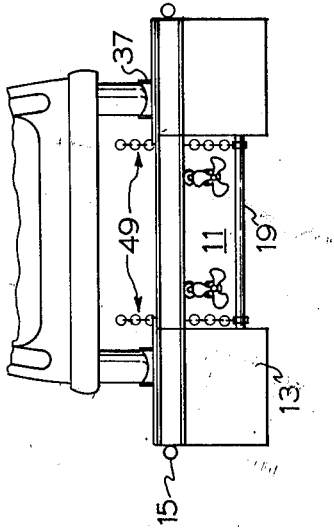
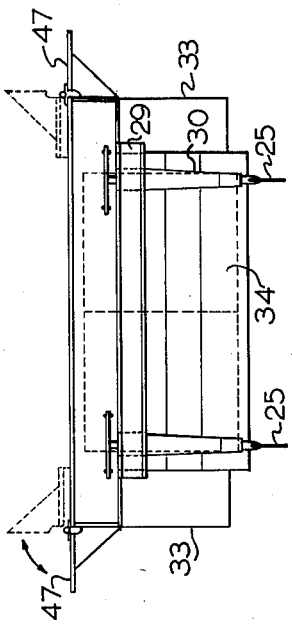
Inventor
Jerome C. Anderson
By His Attorneys
Williamson, Schroeder & Palmatier Feb. 5, 1963 J. C. ANDERSON 3,076,425
BOAT CONVERSION STRUCTURE FOR MOTOR CARS
Filed June 8, 1959 2 Sheets-Sheet 2
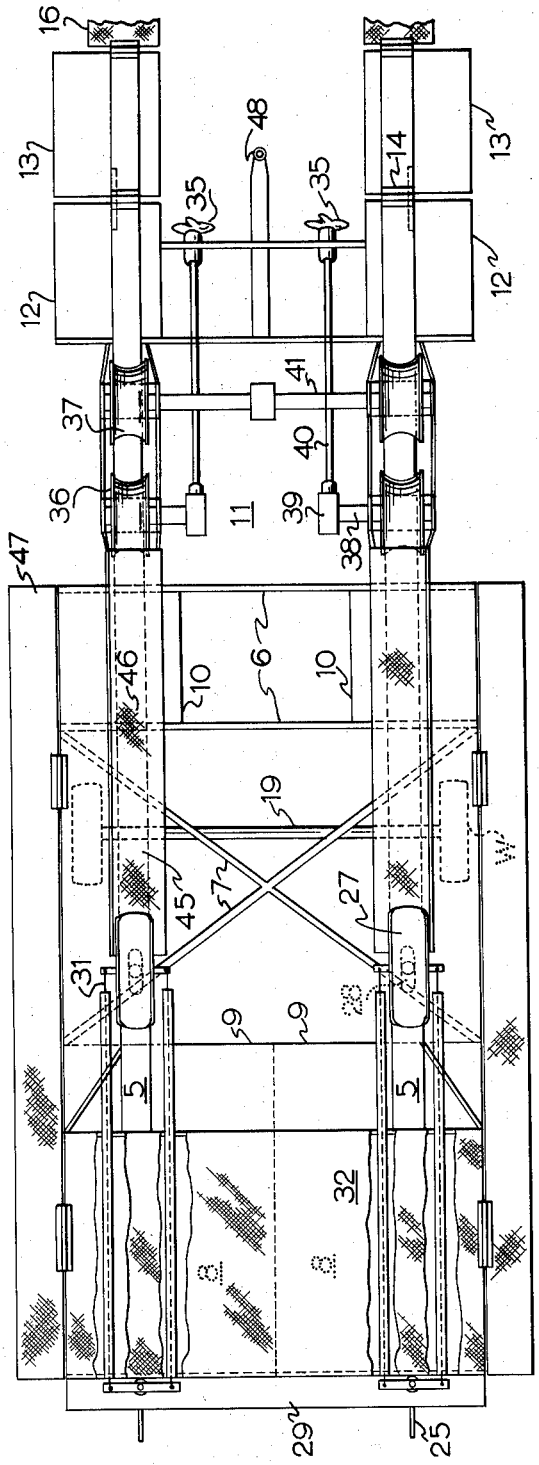
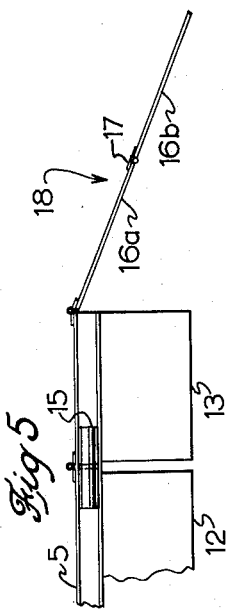
Inventor
Jerome C. Anderson
By His Attorneys
Williamson, Schroeder & Palmatier

United States Patent Office 3,076,425
Patented Feb. 5, 1963

3,076,425
BOAT CONVERSION STRUCTURE FOR MOTOR CARS
Jerome C. Anderson, 2528 17th Ave. S., Minneapolis, Minn.
Filed June 8, 1959, Ser. No. 818,740
7 Claims. (Cl. 115—.5)

This invention relates to a boat structure adapted to carry a self-propelled wheeled vehicle such as an automobile and be driven and steered thereby.

An important object of this invention is a boat structure of novel design and construction adapted to carry an automobile without modification thereof and convert said automobile to a boat, which boat structure is adapted to be driven and steered from the automobile itself, in the same fashion as though the automobile were being operated on land.

Still another object is a boat conversion structure of the class described which is readily adapted for transport on land.

Still another object is a boat conversion structure of the class described having steering or rudder means which are directly motivated in response to the turning movement of the front wheels of the automobile when turned by the operator in the automobile and operating the steering wheel.

Still another object is a boat conversion structure of the class described having novel means for transmitting the power from the drive wheels of the automobile directly to the propulsion system of the boat structure when the automobile is driven in conventional manner.

A further object is a boat conversion structure of the class described having a novel transmission system which prevents slippage and permits uniform and consistent powering of the boat structure.

Still another object is a boat conversion structure of the class described having auxiliary steering means in the event that the primary steering mechanism mal-functions for any reason or requires additional steering mechanism for added control such as in heavy water.

Still another object is a boat conversion structure of the class described wherein sufficient deck space is provided to permit persons to walk thereon, sit, lie, sunbathe or fish as desired.

Another object is a boat conversion structure of the class described which is readily adaptable for use with cars having different or varying lengths of wheel bases.

These and other objects and advantages of my invention will more fully appear from the following description made in connection with the accompanying drawings wherein like reference characters refer to the same or similar parts throughout the several views, and in which:

FIG. 1 is a side elevational view;
FIG. 2 is a top plan view with portions broken away;
FIG. 3 is a front elevational view;
FIG. 4 is a back elevational view; and
FIG. 5 is a detail view of the back portion of the boat structure showing the ramp mechanism.

Referring to the drawings which illustrate a preferred embodiment of my invention, my boat conversion structure is provided with a main supporting structure or frame comprising two elongate rigid spaced apart longitudinally extending side supporting members 5 and a plurality of transversely extending bracing members 6 disposed at strategic points along and between the side members 5, together with diagonal bracing members 7. The side frame members 5 are spaced apart a distance generally corresponding to the axle span of the average automobile to permit such vehicles to be safely carried thereon. To provide a buoyant structure, the main frame has securely mounted thereon a plurality of buoyant sealed tanks or compartments which are of a suitable size to support and maintain the device on and above the water when the structure has a heavy vehicle mounted thereon. To effect this buoyant condition, the main frame has mounted forwardly thereof two large elongate buoyant tanks or compartments 8 which are transversely disposed across the front of the structure and secured together in butted or end to end relationship as by welding, and which are somewhat upwardly and forwardly inclined to gain a planing effect and reduce the amount of water resistance when the structure is being driven through the water. Immediately behind the large front tanks 8 a pair of smaller buoyant tanks 9 are provided which are also secured together in butted relationship and disposed somewhat inwardly from the outer ends of said larger front tanks 8, and beneath the main side supporting members 5. The structure is also provided with a pair of buoyant tanks 10 intermediate the front and back, which tanks 10 are generally vertically and dependingly mounted on side supporting members 5 and preferably maintained in spaced apart relationship to provide a substantial uninterrupted opening or wash way 11 between the sides of the structure.

The back of the structure is also provided with buoyant sealed compartments or tanks, a pair of tanks 12 and 13 being dependingly disposed in tandem relationship on each side of the frame, each pair being in spaced apart relationship from the opposed pair on opposite sides of the washway 11. The leading tank 12 of each tandem pair of tanks is fixedly secured to the frame, while the trailing tank 13 is hingedly mounted in butting relationship with said leading tank as at 14 to permit the trailing tank 13 to be swung upwardly and forwardly to overlie the leading tank 12 and to reduce the overall length of the structure when the structure is being transported on land. An elongate retaining member or rod 15 is slidably and removably engaged with suitable supporting means carried by tanks 12 and 13 to prevent vertical movement or displacement of the trailing tank 13 during use and hold the same in abutting relationship with tthe leading tank 12. Rearwardly extending downwardly inclined loading and unloading ramps 16 are carried by the trailing tanks 13, said ramps being hingedly mounted on the upper rear marginal edge of said tanks as at 17 to permit free swinging vertical movement thereof and permit the same to be folded upwardly so as to overlie the trailing tank 13 when not in use. The ramps 16 consist of upper and lower sections 16a and 16b respectively which are hingedly connected together as at 18 to permit the lower section 16b to be folded back on the upper section 16a to overlie the same when not in use and permit the ramps 16 in collapsed position to overlie the tank 13 only when folded back thereon, so as not to interfere with the folding back and overlying of the tank 13 on tank 12. Suitable means are also provided for maintaining the ramp 16 in rigid condition when extended to prevent collapsing thereof when the vehicle is rolled up and down thereon.

A pair of retractable transport wheels W are provided intermediate the ends of the main frame and supported thereby which in lowered position permits the structure to be easily converted for mobile land transport.

In the form shown, these transport wheels W have a common axle 19 upon which they are rotatably mounted for free wheeling thereon, which axle is suspended from and supported by hanger elements 20 which are pivotally mounted on the side frame members 5 as at 21. Strut elements 22 are pivotally connected at their lower end to the axle 19 and are detachably connected by any suitable hook or fastening means at their upper ends to the side frame members 5 as at 23, so as to be upwardly and rearwardly inclined in fixed transport position and provide a rigid wheel structure during land transport. The strut elements are provided with shock absorbing means such as the compression springs 23. When the structure is afloat, the wheels W are retracted by disconnecting the struts 22 from the frame 5 and folding or swinging the same back onto the hangers 20 where they are detachably secured by any suitable means. The wheels are then swung upwardly and rearwardly into position adjacent the frame 5 as indicated by the dotted position, and are held in this retracted position by any suitable means such as a swing hook carried by the frame 5 and adapted to engage the axle 19.

The steering mechanism of the boat structure includes a pair of primary rudders 24 retractably suspended from each side of the structure from the main frame 5 and also includes a pair of auxiliary rudders 25 mounted forwardly on the bow structure which may be connected or disconnected as desired. The primary rudders 25 are supported by freely rotatable vertical standards or rudder shafts 26 which are fixedly secured at their upper ends to wheel shoes 27 which are concave or dished in cross section have an upturned front and a downturned back portion. The wheel shoes 27 are adapted to receive the front wheels of the automobile and be moved in direct response to the movement of said wheels provided by the ordinary steering motion or movement of the steering wheel within the automobile, which movement by the shoes causes simultaneous corresponding directed rotational movement of the primary rudders. The primary rudders are vertically retractable to a position adjacent the side frame 5, the rudder shaft 26 being freely movable up and down and held in retracted position by any suitable retaining means such as a locking pin. The rudder shafts 26 are seated in longitudinal slots 28 provided in the side frames 5 and are adapted for free sliding movement therein to permit the wheel shoes 27 to be adaptable to receive the front wheels of the vehicles having wheel bases of varying lengths.

The front auxiliary rudders are also retractably mounted on the transverse supporting member 29 by means of vertically retractable rudder shafts 30 and in normal use are permitted to remain idle and non-directed. However, connecting means are provided for directly rotating or steering said auxiliary rudders in response to the movement of the wheel shoes 27. These connecting means, in the form illustrated, consist of a pair of cables 31 of equal length extending between the rudder shafts 26 and 30 and detachably connected to directly opposite sides thereof by any suitable means, the cables when in connected relation preferably having as little slack or play therein as possible to permit substantially simultaneous movement of the rudder shafts 26 and 30. Thus, this interconnected arrangement of the primary and auxiliary rudder units provide in effect a parallelogrammic relationship.

The forward portion of the structure is provided with a platform 32 which is horizontally disposed and overlies the main upwardly inclined buoyant tanks 8 which platform serves as a walkway or deck surface. The forward portion of the structure may also be provided with side fenders or skirts 33 and a front panel or wear plates 34 which substantially enclose, house and protect the tanks 8.

The transmission system for the boat structure includes a transmission system for each vehicle drive wheel which transmits or translates the driving power from the rear vehicle drive wheels to suitable boat propulsion means such as the propellers 35 mounted rearwardly of the structure between the rear tandem tanks 12 and 13. Each transmission system includes a pair of flanged drums 36 and 37 having a generally concave periphery which are mounted in tandem in co-planar relationship, the forwardmost flanged drum 36 serving as the direct drive medium for the transmission system and a rearwardmost drum 37 serving as an idler drum. The peripheral surface of the drums engaged by the vehicle wheels extend slightly above the upper edge of the main frame members 5. The drive drums 36 are drivingly connected to transversely disposed inwardly extending axles or shafts 38 which communicate with suitable drive housings or gear boxes 39 which in turn transmit the power from the drive drums 36 to longitudinally disposed rearwardly extending drive shafts 40 which support and drive the propellers 35.

The idler drums 37 on each side of the boat structure are provided with a common axle or shaft 41 on which they are mounted for common simultaneous rotation therewith so that rotation by one idler drum will cause simultaneous rotational movement in the opposite idler drum. The rear wheels of the vehicle are adapted to rest or nest on and between the drive drum 36 in the idler drum 37 in tangential relationship on each side and simultaneously engages both so that both are driven in direct response to the rotational movement of the drive wheels of the vehicle.

The interconnection of the idler drums 37 is important since it prevents slippage and uneven power distribution in the event that there is an uneven frictional engagement between the vehicle drive wheels and the idler drums 37 on either side of the structure due to wet surfaces or other reasons. Thus, if one of the rear wheels of the vehicle through slippage is being driven at a faster rate than the other wheel, the common axle 41 of the idler drums will transmit the rotational power from the faster wheel through the idler drum engaged therewith to the idler drum engaging the slower wheel, and thence to the slower vehicle wheel thereby causing the slower wheel to speed up to substantially the same speed of rotation as the faster wheel and correspondingly effect a simultaneous speed up of the drive drum engaged with said slower wheel, and thereby maintain a substantially uniform speed of rotation of each of the propellers and prevent the sway or drift which would occur if they were driven at different speeds.

A brake mechanism is also provided for the idler drums 37 which includes a brake element 42 adapted to move into and out of braking engagement with one or both of the idler drums. The brake element may be operated by any suitable means such as a pedal 43 carried rearwardly of the boat structure and connected to the brake element by suitable linkage means 44 which may be operated simply by operating said pedal to release or engage said brake element. The boat structure is also provided with walkways or catwalks 45 on either side of the main frame 5 which overlie and extend outwardly therefrom and are preferably surfaced with slip resistant skid proof material 46 to permit walking thereon in comparative safety particularly when wet. The main catwalk portions 45 are also provided with an additional hinge portion 47 which is adapted to fold upwardly and overlie the main catwalk portion 45 when in transport position to reduce the overall width thereof and to extend outwardly over the water in locked horizontal position to provide a broader walkway when the boat structure is afloat.

The structure is also provided rearwardly with draft or hitch connection 48 to permit the same to be towed or drawn during land transport thereof.

In use and operation, a vehicle such as an automobile is simply driven up the ramps 16 and onto the driveway provided by the main frame 5 in much the same manner as an automobile is driven onto a hoist in the ordinary service garage. The automobile is permitted to come to rest with the front wheels resting in the wheel shoes 27 and with the rear wheels resting on and between the drive and idler drums 36 and 37, the wheel shoes automatically adjusting themselves to the particular wheel base of the vehicle.

When the automobile is properly positioned on the structure, it is preferably secured thereto as by means of suitable locking chains 49 extending between the main frame and the bumpers of the automobile to secure the same to the boat structure and prevent separation of the automobile and the boat structure in the event that the same should be overturned during use. To drive the boat structure all that is needed is to operate the automobile in the same fashion as one would were the automobile being used in conventional manner on land. The rudders are directly responsive to the steering movements of the automobile and the propellers are directly responsive to the rotation of the rear drive wheels of the automobile through the transmission system hereinbefore described.

Thus, when the automobile wheels are in forward drive the boat will be driven forwardly and when the wheels are in reverse drive the structure will be caused to back up or move rearwardly. The open structure beneath the automobile permits the water to flow freely therebetween and provides a very stable structure and one offering a minimum of resistance in the water. The auxiliary rudders also provide alternate steering means in the event that the promary rudders malfunction, and also provide added or additional steering help in the event heavy water is encountered and the primary rudders do not provide sufficient steering control by themselves.

Thus, it can be seen that with the structure of my invention, an automobile may be converted into a boat without any modification whatsoever of the automobile and without even having to remove the wheels therefrom, the automobile serving as the cabin structure and permitting utilization to be made of the convenient steering mechanism and great power capable of being generated by the average automobile.

It will, of course, be understood that various changes may be made in the form, details, arrangement and proportions of the various parts without departing from the scope of my invention.

What I claim is:

1. An apparatus for converting a wheeled vehicle such as an automobile into a boat comprising a buoyant supporting structure for mounting the automobile thereon, a pair of laterally spaced apart steering rudders carried forwardly of said structure means interconnecting said rudders with the wheels of said vehicle for simultaneous turning of the rudders in direct response to the turning movements of the vehicle wheels, propulsion means carried by said structure and transmission means interconnecting said propulsion means with the drive system of said automobile to transmit driving power therefrom to said propulsion means.

2. Apparatus for converting a wheeled vehicle such as an automobile into a boat comprising a buoyant supporting structure for mounting said automobile thereon, steering mechanism carried by said structure and adapted to be cooperatively interconnected with the steering mechanism of said automobile and directly responsive to the movements thereof said steering mechanism including two pairs of laterally spaced apart rudders mounted on the forward portion of said structure, propulsion means, and transmission means cooperatively engaged with said propulsion means and with the driving mechanism of said automobile to transmit the driving power from said automobile directly to said propulsion means.

3. Apparatus for converting a wheeled self-propelled vehicle such as an automobile into a boat comprising a buoyant supporting structure, a pair of laterally spaced rudder members carried forwardly of said supporting structure, wheel engaging means for receiving and engaging the front wheels of said automobile and interconnected with said rudders for steering movement of said rudders in direct response to the movement thereof, a pair of laterally spaced propeller members disposed rearwardly of said structure and transmission means drivingly engaged therewith and cooperatively engaging the rear drive wheels of said automobile to drive said propellers in response to the driving rotational movement of said rear wheels of said automobile.

4. Apparatus for converting a four wheeled self-propelled vehicle into a boat including a buoyant supporting structure, rudder means, means for interconnecting said rudder means and the front wheels of the vehicle for simultaneous corresponding steering movement thereof, propulsion means and transmission means interconnecting said propulsion means with the rear drive wheels of said vehicle for driving said propulsion means in response to the driving movement of said rear wheels, said supporting structure comprising a rigid frame including rigid side members, a buoyant supporting member extending between said side members adjacent the leading edge thereof, said buoyant member having a forwardly and upwardly inclined bottom portion providing a planing surface for the supporting structure, and buoyant supporting means suspended from said side members and extending along the length thereof and defining an open wash way between the sides of said supporting structure extending the major portion of the length thereof and communicating with the trailing edge of said structure.

5. Apparatus for converting a wheeled vehicle such as an automobile into a boat comprising a buoyant structure adapted to mount said automobile thereon, pivotally mounted primary rudder members disposed generally beneath each of the front wheels of the mounted vehicle, the upper end portions of said members having shoe means for cooperatively engaging the front wheels of said vehicle and directly responsive to the turning movements thereof to turn the rudders in the same direction as the vehicle front wheels to steer said boat structure, propulsion means, transmission means drivingly engaged with said propulsion means and with the rear wheels of said automobile for directly transmitting the driving power from said rear wheels to said propulsion means to propel said boat through the water, and an auxiliary pair of laterally spaced rudder members disposed forwardly of said structure and means for detachably interconnecting said auxiliary rudder members with said vehicle front wheels for substantially simultaneous steering movement of said primary and auxiliary rudder members in direct response to the turning movement of said front wheels.

6. Apparatus for converting a wheeled self-propelled vehicle such as an automobile into a boat comprising a buoyant supporting structure, a pair of laterally spaced rudder members carried forwardly of said supporting structure, wheel engaging means for receiving and engaging the front wheels of said automobile and interconnected with said rudders for steering movement of said rudders in direct response to the movement thereof, a pair of laterally spaced propeller members disposed rearwardly of said structure and transmission means drivingly engaged therewith and cooperatively engaging the rear drive wheels of said automobile to drive said propellers in response to the driving rotational movement of said rear wheels of said automobile, and a pair of laterally spaced auxiliary rudders also disposed in the forward portion of said structure and means detachably and cooperatively interconnecting said auxiliary and first named rudders for substantially simultaneous steering movement of said auxiliary and first named rudders in response to the steering movement of said front wheels.

7. Apparatus for converting a wheeled self-propelled vehicle such as an automobile into a boat comprising a buoyant supporting structure, a pair of laterally spaced apart rudder members located forwardly of said supporting structure, wheel engaging means for receiving and engaging the front wheels of said automobile and interconnected with said rudders for providing steering movement of said rudders in direct response to the movement of said wheels, propulsion means including a pair of rearwardly disposed propellers and transmission means drivingly engaged therewith and cooperatively engaging the rear drive wheels of said automobile to individually drive said propellers in response to the independent driving rotational movement of each of said rear wheels of said automobile, said transmission means including a pair of rotatable co-planar drums disposed in tandem for carrying each of the rear wheels of the vehicle, the rear drive wheels of said automobile resting therebetween and simultaneously engaging the peripheries of said drums, each set of drums in tandem including a drive drum drivingly interconnected with one of said propellers and an idler drum, said idler drums being cooperatively interconnected with each other such that each idler drum is rotated in direct response to the rotational movement of said other idler drum to provide uniform balanced drive of said propellers.

References Cited in the file of this patent

UNITED STATES PATENTS

| | | |
|---|---|---|
| 793,633 | Beall | July 4, 1905 |
| 1,419,977 | Nelson | June 20, 1922 |
| 1,484,109 | Beatty | Feb. 19, 1924 |
| 1,568,307 | Acocella | Jan. 5, 1926 |
| 1,804,262 | Lewis et al. | May 5, 1931 |
| 2,282,745 | Preston | May 12, 1942 |
| 2,334,932 | Kaloshin | Nov. 23, 1943 |
| 2,562,431 | Maile | July 31, 1951 |
| 2,914,016 | Sweeny | Nov. 24, 1959 |
| 2,981,221 | Gillois et al. | Apr. 25, 1961 |